UNITED STATES PATENT OFFICE.

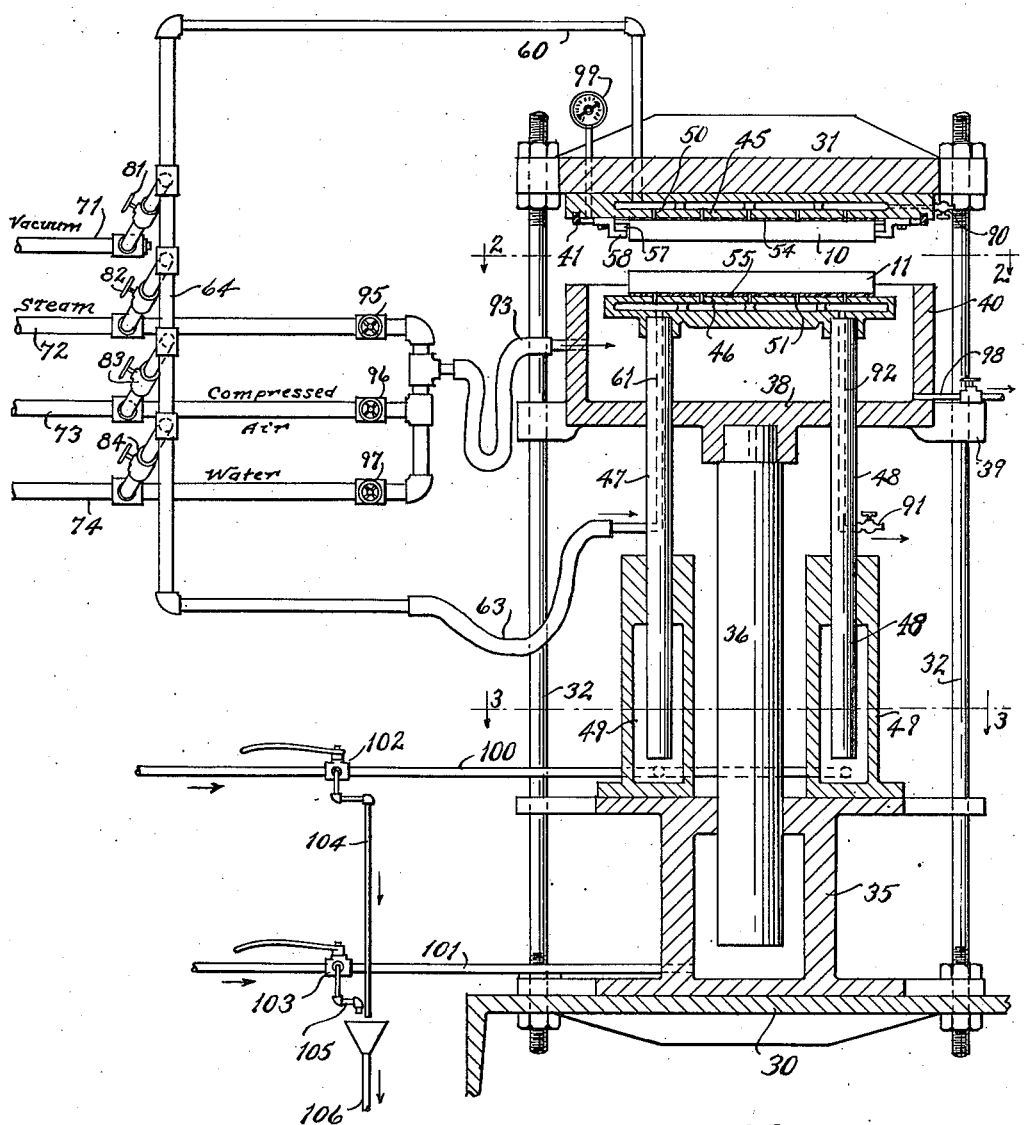

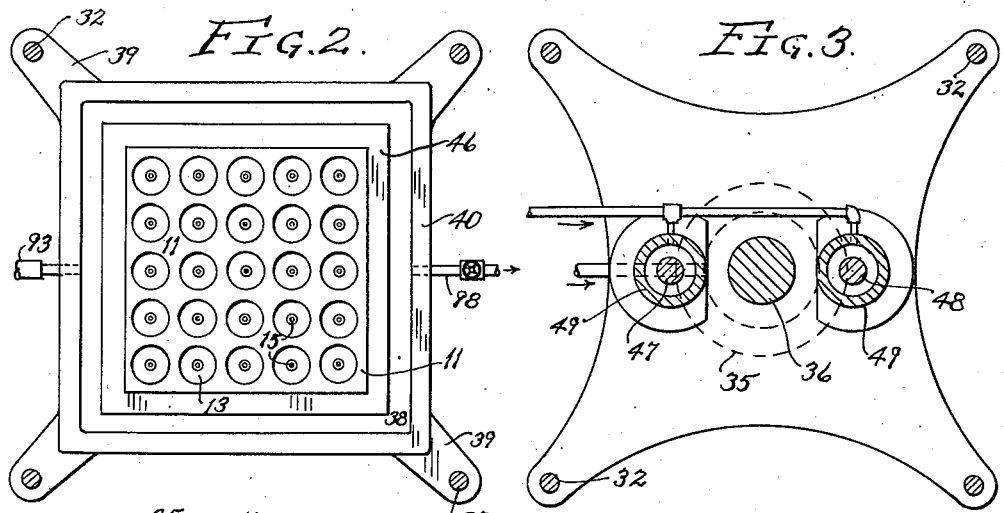
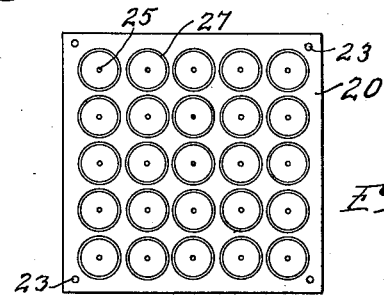
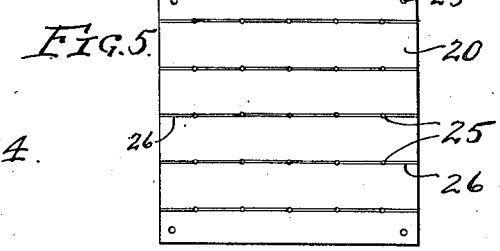
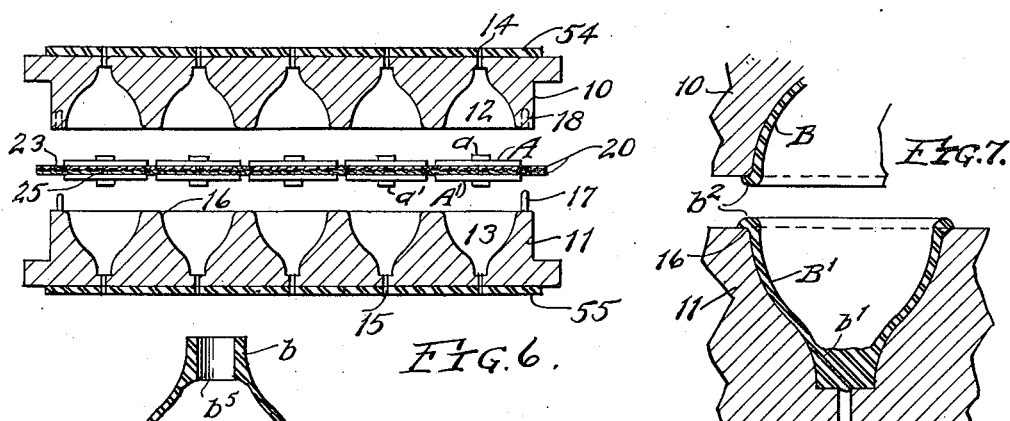
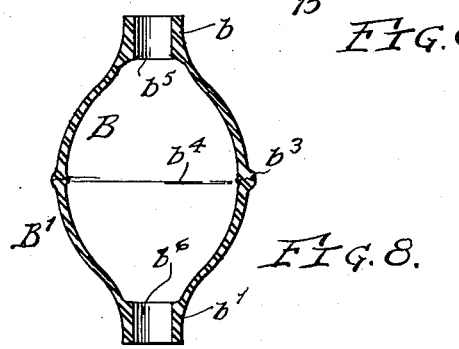

FRED THOMAS ROBERTS, OF TRENTON, NEW JERSEY.

PROCESS OF MAKING HOLLOW RUBBER ARTICLES.

1,201,502.  Specification of Letters Patent.  Patented Oct. 17, 1916.

Application filed September 18, 1915. Serial No. 51,338.

*To all whom it may concern:*

Be it known that I, FRED THOMAS ROBERTS, a citizen of the United States, residing at Trenton, in the county of Mercer and State of New Jersey, have invented a certain new and useful Improvement in Processes of Making Hollow Rubber Articles, of which the following is a full, clear, and exact description, reference being had to the accompanying drawings.

The object of this invention is to provide for the cheap and rapid manufacture of hollow rubber articles of various shapes and sizes.

The invention relates particularly to the formation and treatment of the article in suitable mold cavities and provides for causing the material to readily occupy the cavities and be retained therein along the walls of the cavity, while pressure may be supplied within the hollow of the article, and the parts are effectively vulcanized together.

In the preferred operation of my process I employ mold plates having coöperating cavities of a suitable shape to define the exterior of the article. These cavities are connected with a suitable source of vacuum. Pieces of raw rubber (preferably held temporarily on a suitable support) are placed over the mouths of the cavities, the mold plates are then brought together to clamp the edges of the rubber in place around the cavities, and then the vacuum is applied, drawing the rubber into place in the cavities. The superior atmospheric pressure causes the rubber material to seat firmly against the walls of the cavities, the material protruding slightly beyond the cavities. The material holds its position in these cavities so that the mold plates may now be separated to allow the removal of the support for the rubber stock, and, after such removal, the molds are brought together, bringing the free edges of the two sections into effective contact. While in this contact they are vulcanized.

The superior pressure (above a vacuum) of atmospheric air may be relied on to hold the material in contact with the mold walls during vulcanization; or an artificial pressure may be caused within the article, as, for example, by means of ammonia powder (carbonate of ammonium) placed within the articles, which will vaporize and create a pressure when the article is heated in vulcanizing, or this artificial internal pressure may be provided by bringing the article sections together within an atmosphere of compressed air, as shown, described and claimed in my Patent No. 1,146,523, issued July 13, 1915. In any case, there is a superior pressure within the article which maintains it in contact with the wall of the mold until and during vulcanization.

After vulcanization and the removal of the article, the subsequent treatment depends on the nature of the article. For instance, for balls or other inflated articles, if there is a sufficient internal air pressure, it may be allowed to remain in the article. If the pressure was provided by the heat-expanded ammonia powder, the article may be punctured with a hollow needle, after which air under pressure may be inserted. If the article is not to remain inflated, a suitable incision is made therein to relieve whatever internal pressure there is. With some articles, for example, atomizer bulbs, the incision may take the form of a tubular opening to allow the insertion of the usual metal connection.

The drawings show an apparatus by the aid of which my process may be efficiently performed.

Figure 1 is a somewhat diagrammatic sectional elevation of such apparatus; Figs. 2 and 3 are horizontal sections on the lines 2—2 and 3—3 of Fig. 1; Figs. 4 and 5 are views of the two sides of the plate for supporting the raw rubber stock previous to molding, one of these views being a plan and the other a bottom view; Fig. 6 is a vertical section through a pair of separated mold plates with the material and the supports therefor between the plates ready to be received into the molds; Fig. 7 is an enlarged detail showing the position of the material after it has been drawn into the mold cavities; Fig. 8 is a sectional view of a finished bulb adapted to be manufactured by the aid of the particular apparatus shown, and is intended to be illustrative of any hollow rubber article.

As shown in Figs. 1, 2, 6 and 7, the reference numerals 10 and 11 indicate mold plates having in them, respectively, a series of cavities 12 and 13 of shapes corresponding to the exterior of the article to be produced. The particular shape shown in the drawing is designed to produce an atomizer bulb of the form shown in Fig. 8. The drawing shows twenty-five cavities arranged in five rows of five each in each plate, but it is to be understood that this number may be varied, as desired. Leading into each cavity through the base of the plate is an opening 14, 15, which, as hereinafter described, provides for vacuum connection to exhaust the air within the cavity, thus causing the material to seat therein. One of the mold plates (11 in the drawing) is provided with dowel pins 17 adapted to occupy corresponding recesses 18 in the other plate and position one plate in registration with the other.

Fig. 6 shows a pair of plates 20, 20, for supporting on their upper and under sides the pieces of rubber stock adapted to be drawn into the mold cavities. This stock may be in the form of disks, indicated at A and $A^1$ in Fig. 6. The rubber, in the raw state, is positioned on the plates 20 and temporarily adheres thereto, and two of these plates are placed back to back and put between the mold plates and centered by the dowel pins 17 passing through recesses 23 in the plates. When the supporting plates 20 carrying the pieces of raw material are in place between the mold plates, the latter are brought together, thus compressing the pieces of the disks A and $A^1$ around the rims of the cavities 12 and 13. Then the vacuum is supplied to the openings 14 and 15 and rubber material is drawn into the cavities in snug contact with the walls thereof, as shown at B and $B^1$ in Fig. 7.

The shape and size of the raw material A, $A^1$ is, of course, chosen with reference to the final form of the article and provides sufficient quantity for the article to be of proper thickness when in the mold. It is convenient to use the raw material in sheet form, extra thicknesses of the material being provided where extra thickness is wanted in the molded article. Thus, in the drawing, I have shown small central additional pieces $a$, $a^1$ to provide material enough to make the thickened bosses $b$ and $b^1$ of the molded article.

To enable the vacuum applied to the openings 14 and 15 to draw the raw rubber off of the plates 20 into the cavities I provide a suitable vent for each piece of stock. These vents are shown as holes 25 through the plates 20 which communicate with grooves 26 (Fig. 5) in the opposite side, or back, of the plate. This brings the portion of the rubber adjacent the plate in free communication with the atmosphere surrounding the mold plates. I find it convenient to form in the face of the plate 20 annular grooves 27 (Fig. 4) concentric of the openings 25, these grooves furnishing a guide for placing the disks of raw rubber and also furnishing annular cavities into which the edges of the rubber may pass.

With the construction described, two plates 20 carrying the various disks of raw rubber are placed between the mold plates and the whole brought together and vacuum supplied through the passageways 14 and 15. The relief of the pressure within the cavity thus causes the superior atmospheric pressure acting through the grooves 26 and openings 25 to force the rubber into intimate contact with the walls of the mold cavities, as shown in Fig. 7. The rounded edges 16 of the mold cavities and the annular grooves 27 in the supporting plates provide for a rounded-over bead at the edge of the molded section, as indicated at $b^2$.

After the parts have been molded in the respective cavities, the mold plates are separated and the supporting plates 20 removed, and then the mold plates are brought together, bringing the two beaded edges $b^2$ into intimate contact. This condition is maintained during vulcanization. As heretofore explained, a heat-expanding chemical may be placed in the lower section $B^1$, after the supporting plates have been removed and before the sections B and $B^1$ have been brought together, or, if desired, these sections may be brought together in an atmosphere of compressed air. The apparatus illustrated in the drawings provides for either operation, as well as for bringing the sections together under power and for supplying the vacuum. This will now be more particularly described with reference to Figs. 1, 2 and 3.

In Fig. 1, 30 indicates a suitable base, 31 a top plate, and 32 connecting vertical rods of a mold press. Resting on the base is a hydraulic cylinder 35 having a central plunger 36 connected at its upper end with a vessel or tank 38. This vessel is shown as having legs 39 embracing the rods 32 by which the vessel is guided. The vessel has a side wall 40, the upper edge of which is adapted to abut and make a tight contact with a quadrangular gasket 41 carried on the under side of the head 31. Secured to the under side of the press head 31 is a suitable stationary platen 45 having series of communicating cavities. Within the vessel 38 is a movable hollow platen 46 shown as mounted on a pair of plungers 47 and 48 rising from two hydraulic cylinders 49 supported by the cylinder 35. Leading downwardly from the cavity or cavities of the stationary platen 45 are vertical openings 50 adapted to register with the openings 14 in the mold plate 10 and leading upwardly from communicating cavities of the movable platen 46 are similar openings 51 registering with the openings 15 in the mold plate 11. The mold plates rest on sheets of rubber 54 and 55 which also have openings registering with the openings described.

One or both of the mold plates may be locked in position on the respective platens by any suitable means, as, for example, by wedges 57 driven between shoulders on the mold plates and overhanging shoulders 58 carried by the platens, this locking device being shown only as to the upper mold plate. When these mold plates are in position their cavities are brought into communication with the cavities of the hollow platens, whereby the air may be exhausted from the mold cavities.

Fig. 1 illustrates a system of piping, valves and connections for carrying out the desired operations. Thus, 60 is a pipe connected with the upper platen 45, 61 is a tubular passageway in the plunger 47 leading from the lower platen 46 to an external pipe 63, and the pipes 60 and 63 are shown as connected by a pipe 64. The pipes designated 71, 72, 73 and 74 are adapted to supply respectively vacuum, steam, compressed air and water. Each of these pipes has a branch connected with the pipe 64 under the control of valves designated respectively, 81, 82, 83 and 84. 90 is a vent cock for the upper platen, and 91 a vent cock for the lower platen communicating with it through the tubular passageway 92 in the plunger 48. 93 is an admission pipe to the vessel 38 and is adapted to be put in communication with either of the pipes 72, 73 or 74 under the control of valves 95, 96 and 97 respectively. 98 is a suitable valve-controlled vent from the vessel 38. 99 indicates a suitable pressure gage connected to a pipe passing through the head 31 and terminating within the wall provided by the gasket 41. 100 represents a supply pipe to the two hydraulic cylinders 49, and 101 a similar pipe to the hydraulic cylinder 35. These two pipes are controlled by suitable valves 102 and 103 which, in the open position, allow the admission of pressure fluid to the cylinders; in a closed position retain the fluid therein, and, in a third position, vent those cylinders into pipes 104 and 105 respectively, which are shown as emptying into a suitable discharge 106.

In the operation of the particular apparatus described, the supporting plates 20 carrying the rubber disks A and $A^1$ are placed between the mold plates 10 and 11 and the cock 102 is opened, raising the plungers 47 and 48, and thereby the platen 46, to bring the mold plates together, thus compressing the edges of the raw rubber disks around the rims of the mold cavities. Then (cocks 90 and 91 being closed) the vacuum valve 81 is opened and the vacuum is established through the pipes 60 and 63 from the two platens and thus from the mold cavities. This causes the superior atmospheric pressure to pass through the grooves 26 and openings 25 below the rubber disks A and above the rubber disks $A^1$, forcing these into the respective cavities, and giving them the form shown at B and $B^1$ in Fig. 7. Now, the cock 102 is turned to venting position, relieving the pressure in the cylinders 49, the fluid therefrom discharging into the pipe 104. This causes the lower platen 46 and lower mold plate to drop by gravity, after which the supporting plates 20, freed of their rubber disks, are removed.

The operation so far described brings the mold parts into the position shown in Fig. 7. If desired, simply atmospheric air may be entrapped within the two parts of the article when they are thereafter brought together, or an expansible chemical may be so entrapped, which is placed in the part $B^1$ when in the position shown in Fig. 7. In such cases the enveloping atmosphere of compressed air about to be described will not be employed. When, however, it is desired to fill the articles with air under greater pressure than atmospheric, this is readily accomplished, first by opening the cock 103, whereupon liquid raises the plunger 36, raising the casing 38 until its wall 40 makes a tight contact with the gasket 41, and second, by opening the valve 96 which enables compressed air to pass into the closed chamber, thus provided, and to pass into the cavities of the molded rubber sections. By this means, an exact pressure may be attained in the interior of the article, such pressure being indicated by the gage 99. When the proper air pressure is within the casing 38 the cock 102 is again opened and the plungers 47 and 48 thus raised, closing the mold plates and bringing the edges $b^2$ of the rubber sections together, entrapping the compressed air.

It is to be understood that, throughout the separating action of the mold plates and the removal of the supporting plates 20 and until the production of an effective enveloping atmosphere of compressed air, when employed, the vacuum is continuously maintained in the hollow platens 45 and 46, whereby the articles are held against their mold walls. This vacuum may be maintained until vulcanization is complete, or, if internal compressed air is employed, the vacuum may be relieved as soon as the rubber sections have been brought together. If ammonia powder is employed within the sections the vacuum is preferably maintained at least until the heat of vaulcanization has developed a sufficient internal pressure.

The vulcanizing of the article may readily be accomplished within the press in the apparatus shown in Fig. 1. In such vulcanizing, if the vessel 38 has not been raised to supply compressed air it is now raised in the manner heretofore described. Any compressed air within the closed vessel is relieved by opening the valve in the vent pipe 98—the valve 96 being closed. Then the valve 95 is opened, admitting steam to the vessel surrounding the molds. Where compressed air is employed within the articles, steam may also be admitted to the vacuum spaces in the platens 45 and 46. This is accomplished by closing the valve 81 and opening the valve 82, the opening of the cocks 90 and 91 allowing circulation, if desired.

At the end of the vulcanizing operation the parts may readily be cooled by closing the steam valves described and opening the valve 97, and also the valve 84, if desired, enabling water to enter the vessel 38 and the platen cavities to cool the parts. The cocks 90 and 91 and the relief pipe 98 provide for the draining of such water. After the water has been drained the venting of the cock 102 releases the lower platen, which drops by gravity and separates the mold. In this position the finished articles remain in one mold plate or the other, usually some in one and some in the other. To conveniently free them from their cavities I may simply close the vents 90 and 91 and open the valves 83, admitting compressed air to the platens and from thence to the mold cavities, thus forcing out the molded articles.

The operations described have produced hollow articles which may have atmospheric air or air under greater pressure within them, the article being composed of two parts connected by a vulcanized seam. If an atomizer bulb, for example, has been made, when it is removed from the mold the fins of the seam are trimmed off and the thick bosses at the ends are drilled through, thus producing the finished article shown in Fig. 8. In this figure, $b^3$ represents the external bead left after trimming the portions $b^2$ of Fig. 7, which have firmly united during vulcanization, $b^4$ indicates the seam, and $b^5$ and $b^6$ the drilled tubular openings.

Having thus described my invention, what I claim is:

1. The process of making hollow articles consisting of drawing plastic stock into mold cavities by means of the exhaustion of air from the cavities and thereafter bringing such molded parts together while they remain in their cavities and while the vacuum is maintained, and thereafter curing the parts without separating the mold.

2. The process of making hollow articles consisting of placing plastic stock for the article in two parts across the mouths of two mold cavities, exhausting such cavities, thereafter bringing such molded articles together edge to edge, and providing an increased pressure within the closed article, the vacuum being maintained until such increased pressure is effective.

3. The process of making hollow rubber articles consisting of placing raw rubber stock above the mouths of mold cavities, exhausting the air from such cavities, thereby causing the stock to pass into the same and seat against the walls of the cavities, bringing the parts together and causing a superior pressure within the closed article, the vacuum being maintained until such pressure is sufficient to hold the article effectively against its walls, and vulcanizing the parts together while they are held against the walls of the cavities.

4. The process of making hollow articles consisting of placing two pieces of stock across the mouths of two mold cavities which face each other, exhausting the air from such cavities and thereby causing the stock to be drawn into the cavities, then while the vacuum is maintained bringing the mold sections together to present the molded parts to each other edge to edge, establishing an increased pressure within the closed article and vulcanizing together the parts thereof.

5. The process of making hollow articles consisting of pneumatically forcing plastic stock into mold cavities while the edges of the stock are retained at the rims of the cavities and bringing two of such molded parts together edge to edge, and thereafter curing the article without separating the mold.

6. The process of making hollow rubber articles consisting of clamping raw rubber stock across the mouth of a mold cavity and exhausting such cavity while the article is so held, removing the clamping means while maintaining the vacuum, and thereafter vulcanizing the article while in the cavity.

7. The process of making hollow rubber articles consisting of clamping a piece of rubber stock across the mouth of a cavity, exhausting the air in such cavity while the stock is so clamped, and while the stock is held in the cavity bringing its edge into engagement with other stock.

8. The process of making hollow rubber articles consisting of clamping a piece of rubber stock across the mouth of a cavity, exhausting the air in such cavity while the stock is so clamped, and thereafter removing the clamp and securing the stock at its edge to other rubber stock.

9. The process of making hollow rubber articles consisting of placing stock for the article in two parts across the mouths of two mold cavities, exhausting such cavities while the stock is clamped in place around the rim of the cavity, then removing the clamping means while maintaining the vacuum, and thereafter bringing such molded articles together edge to edge and securing them together.

10. The process of making hollow rubber articles consisting of placing the rubber stock in two sheets across the mouths of two mold cavities, clamping the two pieces of stock in place around the rims of such cavities, exhausting the air from the cavities, thereby causing the rubber stock to be drawn into the cavities, then relieving the clamping at the edges while maintaining the vacuum, and then bringing the edges of the two parts together and vulcanizing them.

11. The process of making hollow rubber articles consisting of clamping raw rubber stock across the mouth of a mold cavity, exhausting such cavity while the article is so clamped, removing the clamping means while maintaining the vacuum, bringing such molded article while in its mold into conjunction with other rubber stock and establishing an artificial internal pressure within the closed article, and vulcanizing the parts together.

12. The process of making hollow rubber articles consisting of placing the rubber stock in two sheets across the mouths of two mold cavities, clamping the two pieces of stock in place around the rims of such cavities, exhausting the air from the cavities, thereby causing the rubber stock to be drawn into the cavities, then relieving the clamping at the edges while maintaining the vacuum, and then bringing the edges of the two parts together and providing an increased pressure in the closed article, the vacuum being maintained until such increased pressure is effective.

13. The process of making hollow rubber articles consisting of placing the rubber stock in two sheets across the mouths of two mold cavities which face each other, bringing such mold members together to clamp the two pieces of stock in place around the rims of such cavities, exhausting the air from the cavities and thereby causing the rubber stock to be drawn into the cavities, then separating the mold members while maintaining the vacuum, then bringing the edges of the two parts together and causing a superior pressure within the article, the vacuum being maintained at least until said superior pressure is sufficient to hold the article against the wall, and vulcanizing together the two parts of the article.

14. The process of making hollow rubber articles, involving the employment of a pair of co-acting mold cavities, consisting of placing two separated pieces of rubber stock between the mold cavities, bringing the cavities together to clamp the stock around the rims of the cavities, exhausting the air from the cavities, separating the cavities from each other, removing the separator from between the pieces of rubber stock and again bringing the cavities together, presenting the article sections to each other edge to edge.

15. The process of making hollow rubber articles consisting of placing two pieces of stock on opposite sides of a separating plate between mold cavities, bringing the mold cavities together to clamp the rubber stock and the separator tightly across the mouths of the cavities, exhausting the air from the cavities to draw the rubber into the cavities, then separating the mold sections while maintaining the vacuum, removing the separating plate and thereafter bringing the mold sections together to present the edge of one molded article to the edge of the other, and vulcanizing such complete article while held in such mold sections.

16. The process of making hollow rubber articles consisting of placing the stock for the article over two plates, placing such plates back to back between mold sections, bringing the mold sections together to clamp the plates and articles, exhausting the cavities of the mold sections, there being suitable vents through the plates to the rubber stock, then while maintaining the vacuum separating the mold sections and removing the plates and thereafter bringing the mold sections together to present the article parts to each other edge to edge.

17. The process of making hollow articles consisting of drawing stock into mold sections by means of a vacuum, and bringing such sections together in an atmosphere of compressed air.

18. The process of making hollow rubber articles consisting of drawing raw rubber stock by a vacuum into mold cavities and holding it in shape therein by a continuous vacuum, and bringing the articles so held into conjunction with other rubber stock within an enveloping atmosphere of fluid under pressure, whereby such fluid is entrapped within the hollow of the article.

19. The process of making hollow articles consisting of placing the stock across the mouths of mold cavities, exhausting the air in such cavities to cause the stock to seat therein and bringing the cavities together in an atmosphere of compressed air, whereby a pressure is maintained within the closed article.

20. The process of making hollow articles consisting of placing plastic stock across the mouths of mold cavities, clamping the edge of the stock in place around the rims of said cavities, exhausting the cavities, then removing the clamping means, and then closing the article within an atmosphere of compressed fluid.

21. The process of making hollow rubber articles consisting of placing raw rubber stock between molds, the edges of the stock being clamped by the molds to the rims of the mold cavities, exhausting the air from such cavities to draw the raw rubber into place therein, separating the mold cavities, and bringing them together within an atmosphere of fluid under pressure.

22. In a process of the character described, consisting of placing separated pieces of raw rubber stock between co-acting separated mold sections, bringing the sections together to clamp the pieces around the edges of the cavities, exhausting the air from the cavities, separating the mold sections while maintaining the vacuum, removing the separator from between the mold sections, and bringing the mold sections together in an atmosphere of fluid under pressure, thereby entrapping such fluid within the closed article which results when the parts are presented to each other edge to edge.

23. A process of the character described consisting of drawing raw rubber by a vacuum into a mold cavity, and maintaining it by the vacuum in such cavity, and vulcanizing it while in such cavity and while the vacuum is maintained.

24. A process of the character described consisting of drawing pieces of raw rubber by a vacuum into mold cavities, maintaining them by the vacuum in such cavities, and bringing the parts together edge to edge and vulcanizing them together while the parts remain in said cavities and while the vacuum is maintained.

25. The process of making hollow rubber articles consisting of drawing raw rubber stock into mold sections by means of a vacuum, bringing such sections together in an atmosphere of compressed air, vulcanizing the parts together while so held, removing the closed article from the mold sections and making an orifice into it relieving the internal pressure.

26. The process of making hollow articles consisting of placing stock therefor between mold members, then bringing the mold members toward each other sufficiently to clamp the stock between them, and thereafter establishing a vacuum between the stock and a cavity in a mold member.

27. The process of making hollow articles consisting of placing pieces of stock therefor between cavitary mold members, then bringing the mold members toward each other into engagement with the stock, then establishing a vacuum between the stock and the cavities in the mold members, while the stock is held at the edges of the cavities.

28. The process of making hollow articles consisting of placing stock therefor between mold members, then bringing the mold members toward each other sufficiently to clamp the stock between them, then establishing a vacuum between the stock and a cavity in a mold member while the stock is held at the edge of the cavity, and thereafter completing the curing of the molded article while in the same mold.

29. The process of making hollow articles consisting of placing two pieces of stock between mold members, bringing such mold members upon such stock, then exhausting air between a mold member and the stock while allowing access of air to the space between the two pieces of stock, and thereafter completing the curing while the article is in the same mold.

30. The process of making hollow articles consisting of placing two pieces of stock and an intermediate separator between mold members, bringing such mold members together to clamp the stock and separator, then establishing a vacuum between the stock and mold members, then separating the mold members and removing said separator while continuing the vacuum, and then bringing the mold members into coaction.

31. The process of making hollow articles consisting of placing two separated pieces of stock therefor between mold members, then bringing the mold members toward each other sufficiently to clamp the stock between them, then establishing a vacuum between the stock and cavities in the mold members while the stock is held at the edges of the cavities, then separating the mold members while maintaining the vacuum and withdrawing the separator between the pieces of stock, and thereafter returning the mold members into coaction with each other and completing the curing of the molded article while in the same mold.

32. The process of making hollow articles of plastic material consisting of drawing the material into mold cavities by suction, thereafter holding the parts against the walls of the cavities by means of fluid under pressure within the articles, curing the articles while so held, and removing them from the mold.

33. The process of making hollow articles consisting of drawing the plastic stock into mold cavities by means of a vacuum while the edges of the stock are retained at the rims of the cavities, bringing two of such parts together edge to edge in the presence of compressed fluid in the interior thereof, and thereafter curing the article without separating the mold.

34. The process of making hollow articles of plastic material consisting of placing sheets of stock across the mouths of mold cavities, applying a vacuum to such cavities to draw the stock into the cavities against the walls thereof, bringing the parts together edge to edge while in their cavities, in the presence of compressed fluid in the interior of the article, and vulcanizing the article.

35. The process of making hollow rubber articles consisting of drawing parts of the articles into mold cavities by means of a vacuum, holding the parts against the walls of said cavities by means of compressed fluid within the articles, and vulcanizing them while so held.

36. The process of making hollow rubber articles consisting of placing raw rubber stock across the mouths of mold cavities, exhausting the air from such cavities, thereby causing the stock to pass into the same and seat against the walls of the cavities, bringing the parts together and causing a superior pressure within the closed article, and vulcanizing the parts together while they are held against the walls of the cavities.

37. The process of making hollow rubber articles consisting of securing raw rubber stock across the mouth of a mold cavity, exhausting such cavity while the stock is so secured to mold the stock to substantially the form of the cavity, bringing such molded part into conjunction with other rubber stock, establishing an artificial internal pressure within the closed article, and vulcanizing the parts together.

38. The process of making hollow rubber articles consisting of holding sheets of stock across the mouths of mold cavities, exhausting the air in such cavities to cause the stock to seat therein, bringing the cavities together and establishing a pressure higher than the atmospheric pressure within the article while it is within the cavities, and vulcanizing the article while within the cavities and while the internal pressure is maintained.

In testimony whereof, I hereunto affix my signature.

FRED THOMAS ROBERTS.

Witness:
HERBERT R. STRAUSS.